United States Patent Office 3,340,264
Patented Sept. 5, 1967

3,340,264
PROCESS FOR PREPARING N,N'-DIARYLPERY-
LENETETRACARBOXYLIC DIIMIDES
Richard L. Walker, Earleville, Md., assignor to E. I. du
Pont de Nemours and Company, Wilmington, Del., a
corporation of Delaware
No Drawing. Filed May 6, 1964, Ser. No. 365,513
6 Claims. (Cl. 260—281)

The present invention is directed to a novel process for the preparation of N,N'-diarylperylenetetracarboxylic diimides which involves the condensation of 3,4,9,10-perylenetetracarboxylic acid or its anhydride with a primary arylamine.

The N,N'-diarylperylenetetracarboxylic diimides are useful in the dyeing of cellulosic fibers from an alkaline hydrosulfite vat. These dyestuffs are valuable because of their ability to yield dyeings in bright red shades of good fastness properties.

Several methods for preparing perylenetetracarboxylic diimides have been utilized in the art. One such method for preparing these diimides involves heating N-substituted 1,8-naphthalenedicarboxylic imides in an alkaline melt as described in U.S.P. 1,200,848. However, as noted in U.S.P. 1,913,052, a serious disadvantage to this alkali fusion method results from the fact that the diimides recovered from the process are contaminated by large amounts of impurities. Another method for preparing perylenetetracarboxylic diimides, discussed in British Patent 201,786, involves heating perylenetetracarboxylic acid at 100° to 120° C. in an excess of an arylamine, such as aniline. In still another method of manufacture, perylenetetracarboxylic acid or anhydride is heated at high temperatures in an inert organic solvent in the presence of an arylamine. The latter two methods require the handling of toxic organic solvents at high temperatures and the added undesirable separations of said expensive solvents from the reaction products. In all of the above procedures, anhydrous or essentially anhydrous conditions are employed. In these condensation reactions anhydrous conditions were considered essential since water is split-out in the condensation reaction.

More recently, a method for the preparation of N,N'-diarylperylenetetracarboxylic diimides was disclosed in U.S.P. 2,543,747 which involves condensing a perylenetetracarboxylic acid or anhydride with an arylamine in water as diluent. For the best results, this reaction is carried out under pressure at a temperature from about 130° to 150° C. There are serious disadvantages, however, to the aqueous reaction described in U.S.P. 2,543,- 747. It has been found that if the reaction is not carried out by heating under pressure the reaction time is prolonged and the reaction product inferior. When conducting the reaction at refluxing temperatures without pressure, a poor quality product is obtained because of contaminants which appear to be side reaction products, such as organic acid-amine salts and half condensation products. On the other hand, if the reaction is carried out under pressure, the disadvantages and costs incident to reacting under pressure make the process a much less desirable method for the commercial preparation of the diimides.

A satisfactory process, therefore, has not been developed whereby the perylenetetracarboxylic acid and arylamine are condensed in an aqueous medium at ordinary pressures to give a diimide product of excellent quality and in high weight yield.

It is, therefore, an object of the present invention to provide a process for the manufacture of N,N'-diarylperylenetetracarboxylic diimides in excellent yield and quality by condensing 3,4,9,10-perylenetetracarboxylic acid or its anhydride with primary arylamines of the benzene series in an aqueous medium at ambient pressure.

This object and other objects will become apparent from the following description and claims.

More specifically, the present invention is directed to a process for the manufacture of N,N'-diarylperylenetetracarboxylic diimides which comprises heating in an aqueous medium a mixture comprising one mole of 3,4,9,10-perylenetetracarboxylic acid, or its anhydride, with at least two moles of a primary amine of the benzene series in the presence of a tertiary nitrogen base selected from the group consisting of pyridine, alkylpyridines, quinoline, isoquinoline, and N,N-dialkylanilines, said mixture being heated under ambient pressure to a temperature of about 85° C. to the refluxing temperature of said mixture.

It has been unexpectedly found that the condensation of perylenetetracarboxylic acid with an arylamine in an aqueous medium can be accomplished without pressure and at lower temperatures if the reaction is conducted in the presence of a catalyst selected from a class of certain tertiary nitrogen bases. It has further been discovered that the product obtained from this catalyzed reaction is of excellent quality and recoverable in high yields. The improvement in the quality of the product is realized since the amount of contaminants and partially reacted starting materials in the final product are markedly reduced in the catalytic process.

The tertiary nitrogen base catalysts utilized in the present invention are alpha-picoline, pyridine, mixed lutidines, quinoline and N,N'-dimethylaniline. Other catalysts which may be used in lieu of these commercial mixtures of tertiary arylamines are the 3- and 4-methylpyridines, ethylpyridines, the dimethylpyridines, isoquinoline and N,N-diethylaniline.

The amount of catalyst used is not critical and can vary over a wide range. Small amounts of the catalysts have been noted to exert beneficial effects on the condensation reaction when conducted under ambient pressure. However, it is more preferred to use at least one mole of the tertiary nitrogen base per mole of perylenetetracarboxylic acid in order to obtain a product of the best quality in the highest yield. No additional beneficial effect on the condensation reaction is observed, however, when more than 3 moles of the catalyst per mole of perylene compound is utilized in the present invention. Thus the preferred range of the amount of catalyst utilized in the present invention is from 1 to 3 moles of catalyst per mole of perylene compound.

The perylene compound utilized as a starting material in the present invention may be the 3,4,9,10-perylenetetracarboxylic acid anhydride, the corresponding carboxylic acid or an alkali metal (Na, K, Li) or ammonium salt of this acid. It has been ascertained that the reaction proceeds at optimum speed with high quality if the perylenetetracarboxylic acid starting material is first obtained in an extremely finely divided condition which facilitates its conversion by the arylamine. The free tetracarboxylic acid is obtained in this desired finely divided form when precipitated from a solution of its soluble salt, as more fully illustrated in the following examples. Precipitating acids which may be employed for this purpose are acetic, hydrochloric, sulfuric or formic acid.

The primary aryl monoamines of the benzene series which are utilized in the present invention are p-chloroaniline, p-anisidine, aniline, m-chloroaniline, 3,4-dichloroaniline, m- or p-toluidine, p-ethylaniline, p-ethoxyaniline, sulfanilic acid, metanilic acid and m- or p-aminobenzoic acid.

The reaction mixture must provide two moles of the arylamine per mole of the perylenetetracarboxylic acid in order to have completely reacted condensation products. The concentration of the reaction mixture in water is not critical, since dilution of the reaction mass does affect the yield and quality of the end product.

The condensation temperatures may vary upward from about 85° C. to the refluxing temperature. A convenient and preferred range is about 90° to 100° C. Heating under pressure, at temperatures above the normal refluxing temperature, shows no additional improvement in yield and quality over that obtained by operating according to the present invention.

Representative examples illustrating the present invention are as follows. All parts are by weight unless otherwise specified.

*Example I*

(a) An aqueous filter cake containing 24 parts of 3,4,9,10-perylenetetracarboxylic acid (obtained by acidification of an alkaline solution of said acid followed by filtration and washing the product with water) is mixed with sufficient water to provide a total of 254 parts. After stirring to a smooth slurry at ambient temperature, there are added 18.0 parts of p-chloroaniline and 10.0 parts of pyridine. The resulting slurry is heated to 95°–100° C. and agitated at this temperature for 16 hours. After cooling to 50°–60° C., the slurry is filtered and the condensation product is thoroughly washed with hot water. The filter cake is slurried in water and heated at 85°–90° C. with alkaline sodium hypochlorite for 4 hours. After filtering, washing the filter cake with water, and drying the product, there are obtained 33.1 parts (96.5% of the theoretical yield) of the N,N'-bis(p-chlorophenyl)-3,4,9,10-perylenetetracarboxylic diimide (Color Index No. 71,135) which dyes cotton in scarlet shades from an alkaline hydrosulfite vat. The chlorine content of the product is 10.8%. The calculated chlorine content is 11.6%.

(b) When the procedure of part (a) of this example is repeated except that the amount of pyridine catalyst is decreased to 5.0 parts, the yield of the final dye is 88.3% of the theoretical yield.

(c) Substitution of 10 parts of alpha-picoline for the pyridine in part (a) of the present example also results in a yield of 95.1% of the theoretical yield.

*Example II*

(a) A mixture of 19.6 parts of 3,4,9,10-perylenetetracarboxylic acid anhydride, 20 parts potassium hydroxide and 350 parts water is heated to 90° C. and held until the anhydride is completely dissolved. The solution is cooled to 50° C., and transferred to a flask containing 100 parts water, 26.3 parts glacial acetic acid, 19.1 parts p-chloroaniline and 8.5 parts of alpha-picoline (2-methylpyridine). The resulting orange slurry is heated and agitated at refluxing temperature for 15 hours. After cooling, filtering, washing the filter cake with water, and drying, there are obtained 29.8 parts (97.6% of the theoretical yield) of the N,N' - bis(p - chlorophenyl)-3,4,9,10-perylenetetracarboxylic diimide (Color Index No. 71,135). The chlorine content of the product is 11.1% or 95% of the theoretical amount. The product thus obtained dyes cotton in scarlet shades from an alkaline hydrosulfite vat.

(b) When the procedure of part (a) of this example is repeated except that the catalyst, alpha-picoline, is omitted, the yield is less (84.6% of the theoretical yield) and the color is much weaker tinctorially. The chlorine content is 5.9% or only 50.9% of the theoretical amount.

(c) When 7 parts of pyridine are substituted for the alpha-picoline in part (a) of the present example similar results are obtained.

Other tertiary bases such as mixed lutidines, quinoline, and N,N-dimethylaniline produce similar results when employed in part (a) of this example in the place of alpha-picoline.

*Example III*

The procedure of Example II(a) is repeated except that 16.0 parts of p-anisidine are used instead of p-chloroaniline and the reaction mass is heated for 15 hours at 93° to 97° C. instead of refluxing temperature. After cooling, filtering, washing the filter cake with water, and drying, there are obtained 26.9 parts (89.4% of the theoretical yield) of the N,N'-bis(p-methoxyphenyl)-3,4,9,10-perylenetetracarboxylic diimide (Color Index 71,140).

*Example IV*

Perylenetetracarboxylic acid aqueous filter cake, equivalent to 29.5 parts of the dry tetracarboxylic acid, is mixed with sufficient water to provide a total of 400 parts, including the water in the filter cake. After stirring at ambient temperature to a smooth slurry, there are added 33.5 parts of potassium carbonate. The mass is heated to 88° to 92° C. and agitated at this temperature for 8 hours. After cooling the slurry below 40° C. there are added 21.6 parts of p-chloroaniline followed by the slow addition of 35.5 parts of glacial acetic acid. The pH of the resulting orange slurry should be in the range of 4–7 for optimum results, and may be adjusted as necessary by adding either potassium carbonate or acetic acid. After adding the above materials and making the above pH adjustments, there are added to the reaction mixture 6.5 parts of alpha-picoline and the slurry is heated to 93° to 97° C. and agitated at this temperature for 15 hours at essentially neutral conditions. After cooling by dilution with 1000 parts of water, the slurry is made alkaline with sodium hydroxide and bleached by heating in the presence of sodium hypochlorite for 4 hours at 60° to 65° C. After filtering, washing the filter cake with water, and drying, there are obtained 40.7 parts (96.4% of theoretical yield) of color which is slightly brighter than that obtained in Example I when applied to cotton from a vat dye bath.

If the bleach is omitted from the above procedure, a quantitative yield of a slightly duller product is obtained. The bleach serves a dual role in that it also decomposes excess p-chloroaniline providing for safer handling of waste liquors during isolation in addition to brightening the dye products.

It is to be understood that the preceding examples are representative and that said examples may be varied within the scope of the total specification, as understood by one skilled in the art, to produce essentially the same results.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A process for the preparation of N,N'-diarylperylenetetracarboxylic diimides which process comprises heating in an aqueous medium a mixture consisting essentially of one mole of a member selected from the group consisting of 3,4,9,10-perylenetetracarboxylic acid and the anhydride thereof and at least two moles of a primary arylamine in the presence of a tertiary nitrogen base selected from the group consisting of pyridine, alkylpyridine, quinoline, isoquinoline, and N,N-dialkylanilines, said mixture being heated under ambient pressure to a temperature of from about 85° C. to the refluxing temperature of said mixture, and recovering from said aqueous medium N,N'-diarylperylenetetracarboxylic diimide.

2. The process of claim 1 wherein the arylamine is p-chloroaniline.

3. The process of claim 1 wherein the arylamine is p-methoxyaniline.

4. The process of claim 1 wherein the tertiary nitrogen base is alpha-picoline.

5. The process of claim 1 wherein the tertiary nitrogen base is pyridine.

6. The process of claim 1 wherein the mixture is heated to a temperature of from 93° to 100° C.

References Cited

UNITED STATES PATENTS 2,794,805  6/1957  Schmidt-Nickels _____ 260—281

FOREIGN PATENTS 835,459  5/1960  Great Britain.
837,327  6/1960  Great Britain.
1,132,272  6/1962  Germany.

ALEX MAZEL, *Primary Examiner.*

D. G. DAUS, *Assistant Examiner.*